US008453374B2

(12) United States Patent
Saunders

(10) Patent No.: US 8,453,374 B2

(45) Date of Patent: Jun. 4, 2013

(54) CUSHION FOR BUTT-END OF FISHING ROD

(76) Inventor: Mick B. Saunders, Plainwell, MI (US)

( * ) Notice: Subject to any disclaimer, the term of this patent is extended or adjusted under 35 U.S.C. 154(b) by 122 days.

(21) Appl. No.: 12/930,906

(22) Filed: Jan. 19, 2011

(65) Prior Publication Data

US 2012/0180374 A1 Jul. 19, 2012

(51) Int. Cl.
*A01K 87/08* (2006.01)

(52) U.S. Cl.
USPC .......... 43/23; 43/25

(58) Field of Classification Search
USPC .......... 43/21.2, 23, 25; 16/431-436, DIG. 12
IPC .......... A01K 87/08,97/10
See application file for complete search history.

(56) References Cited

U.S. PATENT DOCUMENTS

| | | | | |
|---|---|---|---|---|
| 1,556,966 | A * | 10/1925 | Selig | 16/441 |
| D119,262 | S * | 3/1940 | Gurrieri | D22/142 |
| 5,551,184 | A | 9/1996 | Grosse | |
| 2004/0049967 | A1 * | 3/2004 | DeSorcy | 43/25 |

* cited by examiner

*Primary Examiner* — Darren W Ark
*Assistant Examiner* — Timothy Schwarz
(74) *Attorney, Agent, or Firm* — Flynn, Thiel, Boutell & Tanis, P.C.

(57) ABSTRACT

An elastic cushion for enveloping the butt-end of a fishing rod. The cushion includes a unitary body having a cylindrical section at one end and a bulbous section at the opposite end. A central bore extends through the cushion. The central bore tapers from a large adjacent the one end to a second diameter located within the bulbous section to removably retain the rod in the central bore. An exterior surface of the bulbous section has a plurality of separate flutes for enhancing a frictional gripping of the bulbous section of the cushion body with the fisher-person's body and at least one of the flutes transitioning onto an exterior surface of the cylindrical section to enhance the frictional gripping of at least one hand of the fisher-person with the exterior surface of the cylindrical section.

9 Claims, 3 Drawing Sheets

CUSHION FOR BUTT-END OF FISHING ROD

FIELD OF THE INVENTION

This invention relates to a slide on cushion for the butt-end of a fishing rod.

BACKGROUND OF THE INVENTION

It is known from U.S. Pat. No. 5,551,184 to provide a slide on device to protect the fishing person's body from the forces applied by a butt-end of the fishing rod, when fighting a large fish, and when the butt-end of the fishing rod is placed against the abdominal region of the body to leverage the rod in such a way to enable one hand of the fishing person to manipulate the handle on the reel. This known device is not well suited for holding the device in the hand due to the outer diameter being in the range of three to ten inches in diameter. Often times, the fishing person may desire to hold the rod in one hand while adjusting the lure or maneuvering the line with a fish on the lure without removing the device from the butt-end of the rod. Furthermore, the exterior surface of the device can slide relative to the abdominal region.

Accordingly, it is an object of this invention to provide a slide on cushion for the butt-end of the fishing rod which has a elongate body with an upper elongate cylindrical body section of sufficient diameter to easily grasped by the fishing person's hand and a lower bulbous section of sufficient diameter to provide sufficient protection to the abdominal region to prevent bruising when fighting a large fish and when the butt-end is placed against the abdominal region.

It is a further object of this invention to provide a slide on cushion, as aforesaid, wherein a plurality of flutes are provided on the exterior surface of the bulbous section to enhance the ability of the cushion to not slide relative to the person's body while the cushion is forcibly held against the abdominal region while fighting a large fish.

SUMMARY OF THE INVENTION

The objects and purposes of the invention are met by providing an elastic cushion for enveloping the butt-end of a fishing rod. The cushion includes a unitary body having a cylindrical section at one end and a bulbous section at the opposite end. A central bore extends through the cushion. The central bore tapers from a large adjacent the one end to a second diameter located within the bulbous section to removably retain the rod in the central bore. An exterior surface of the bulbous section has a plurality of separate flutes for enhancing a frictional gripping of the bulbous section of the cushion body with the fisher-person's body and at least one of the flutes transitioning onto an exterior surface of the cylindrical section to enhance the frictional gripping of at least one hand of the fisher-person with the exterior surface of the cylindrical section.

BRIEF DESCRIPTION OF THE DRAWING

Other objects and purposes of the invention will be apparent to persons acquainted with apparatus of this general type upon reading the following specification and inspecting the accompanying drawings, in which.

DETAILED DESCRIPTION

Figure 5:
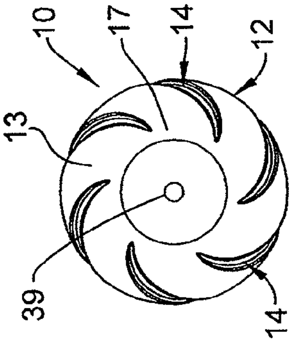
FIG. 5 is a bottom view thereof.

Certain terminology will be used in the following description for convenience in reference only and will not be limiting. The words "up", "down" "right" and "left" will designate directions in the drawings to which reference is made. The words "in" and "out" will refer to directions toward and away from, respectively, the geometric center of the device and designated parts thereof. Such terminology will include derivatives and words of similar import.

FIGS. 1 to 5 illustrate the unitary cushion 10 embodying the invention. The unitary cushion 10 includes an upper cylindrical section 11 and a lower bulbous section 12 that is larger is overall diameter that the diameter of the upper cylindrical section 11. The exterior surface 13 of the bulbous section 12 has a plurality of flutes 14 circumferentially spaces around the periphery thereof and extending from a juncture 16 between the cylindrical section 11 and the bulbous section 12 downwardly to a location on a rounded bottom 17 of the cushion 10 that is spaced radially outwardly from a central longitudinal axis 18 of the cushion. The term "flute" is to be interpreted as a structural term referring to the longitudinally extending and rounded shallow concave cross-sectional shape of each of individual groove 19 on the exterior of the bulbous section 12. At least one of the flutes 13 on the bulbous section 12 extends through the juncture 16 onto the exterior surface 21 of the cylindrical section 11 as at 22. The shape and depth of the groove 22 is the same as the shape and depth of the groove 19 on the bulbous section 12. In this particular embodiment, there are two diametrically spaced grooves 22 on an exterior surface 21 of the cylindrical section 11.

Figure 6:
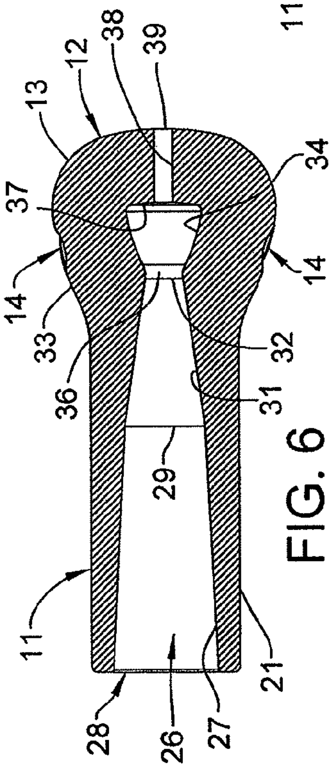
FIG. 6 is a sectional view taken along the line 6-6 in FIG. 3.
Figure 4:
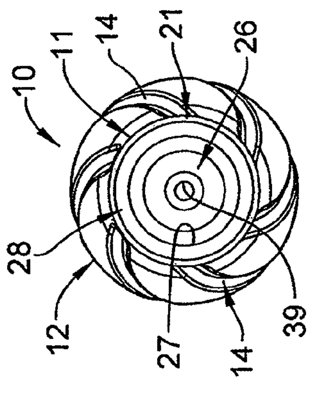
FIG. 4 is a top view thereof.

A central bore 26 extends axially through the center of the cushion 10 as illustrated in FIG. 6. The central bore 26 has a first bore section 27 that tapers from a large diameter adjacent a top 28 end of the cushion 10 to a smaller diameter located at a mid-length location 29 in the interior of the cushion 10. The central bore 26 also includes a second bore section 31 that tapers from the smaller diameter as at 29 to an even smaller diameter as at 32 located inside a top portion 33 of the bulbous section 12. The central bore 26 also includes a third bore section 34 that expands in diameter from the smaller diameter 32 through a curved joining section 36 joining the second bore section 31 to the third bore section 34 to a flat bottom wall surface 37 located at about the mid-diameter location of the bulbous section 12. The purpose of the smaller diameter 32 is to provide a restriction for preventing the butt-end of any fishing rod from entering into the bore section 34. The central bore 26 also includes a central fourth cylindrical bore section 38 that extends between the third bore section 34 to an opening to the exterior as at 39. The bore section 38 facilitates the drainage of any water that may collect in the bore section 34. The lower end of each of the grooves 19 on the bulbous section 12 terminate at a location that is radially outwardly spaced from the opening 39 as shown in FIG. 1.

The unitary cushion is made of an elastic material that is capable of retaining its shape during use and having an outer surface with a high coefficient of friction. In this particular embodiment, the elastic material is tough, close-celled flexible foam. This type of foam may be made from materials such as polyvinylchloride, polyurethane, polystyrene, polypropylene, polyethylene, neoprene and mixtures thereof. The foam may be non-reticulated (closed-cell) or reticulated (open-cell), pending upon the softness of the foam and other parameters. In this particular embodiment, the preferred material is a Vinyl-free Olefin based closed-cell, cross-linked elastomer. The Shore A durometer of the preferred material is in the range of 5 to 50 with the preferred range being 15 to 25.

Figure 2:
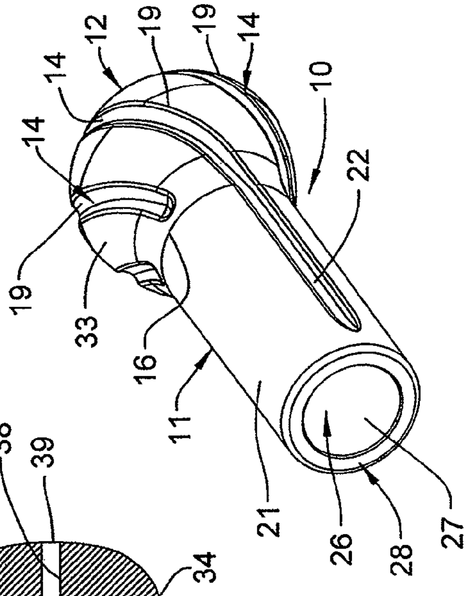
FIG. 2 is a top and left side isometric view thereof.
Figure 3:
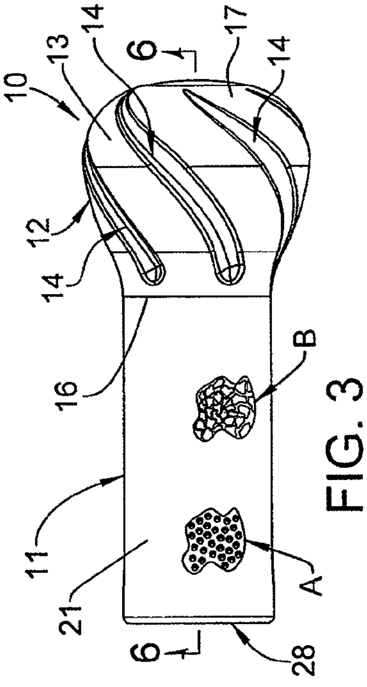
FIG. 3 is a left side view thereof.
Figure 1:
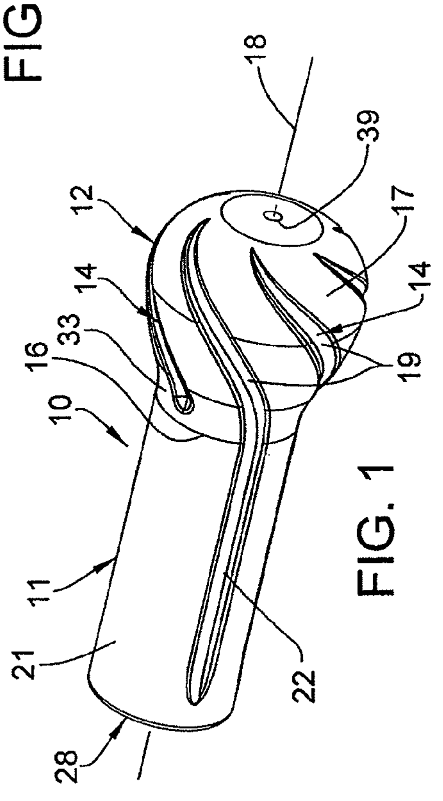
FIG. 1 is a left side and bottom isometric view of a slide on cushion for a fishing rod.
Figure 7:
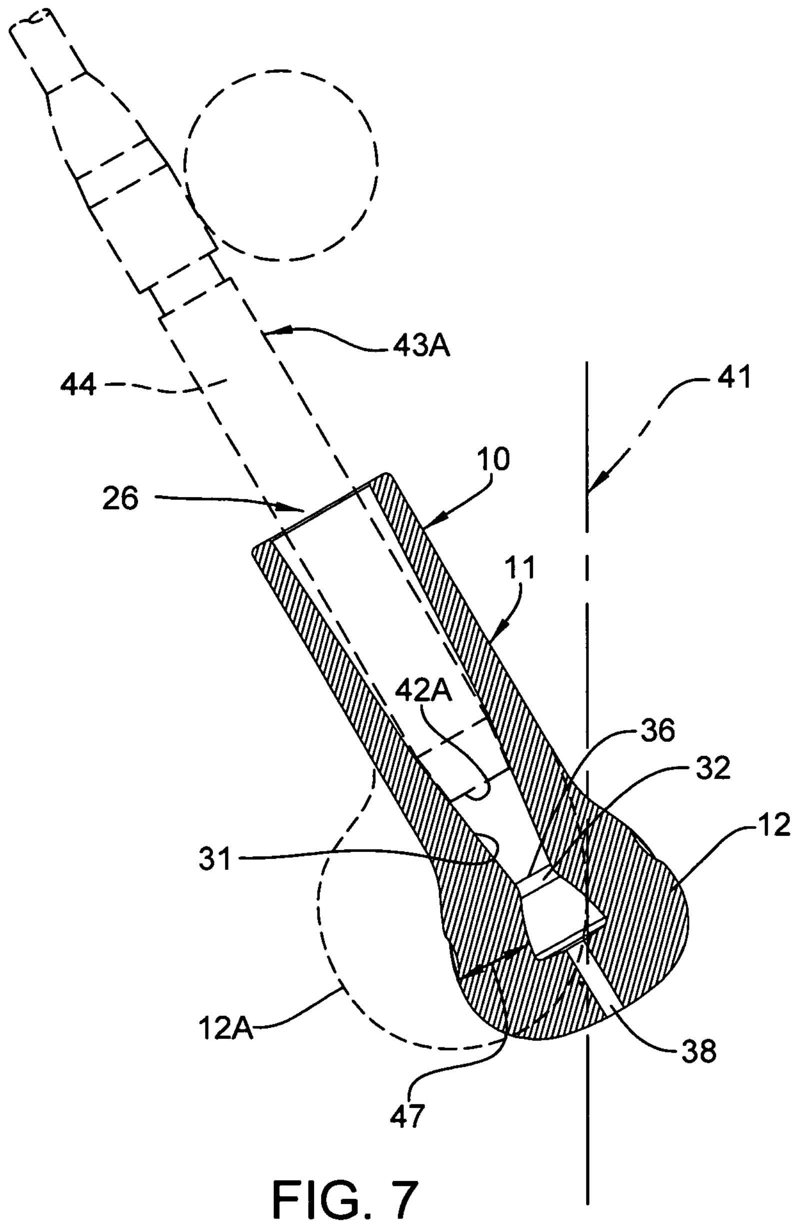
FIG. 7 is a central sectional view of the cushion having a butt end of a first embodiment of a fishing rod inserted into the cavity in the cushion.
Figure 8:
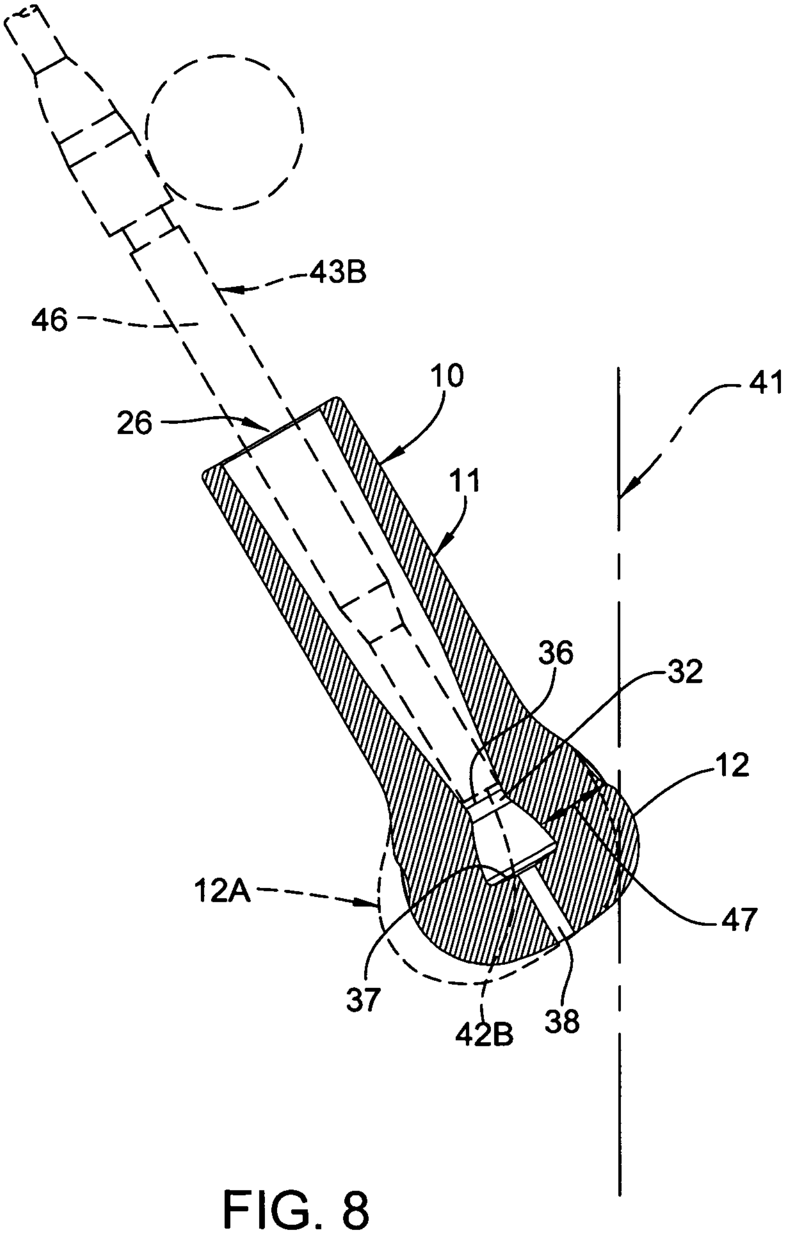
FIG. 8 is a central sectional view of the cushion having a butt end of a second embodiment of a fishing rod inserted into the cavity in the cushion.

As shown in FIGS. 1-3, there is an initial alignment of the longitudinally extending axis of the cylindrical section 11 and the geometric center of the bulbous section 12. Since the cushion 10 is made of the flexible material described above, the geometric center of the bulbous section 12 can be flexed out of axial alignment with the longitudinally extending axis of the cylindrical section 11 as depicted in broken lines in FIGS. 7 and 8. The degree of flex, when the bulbous section 12 is placed against the abdominal region of the person's body (represented schematically by a broken line 41 in FIGS. 7 and 8), is determined by the distance that the butt-end 42A and 42B of the fishing rods 43A and 43B (shown also in broken lines at 12A in FIGS. 7 and 8) enter the central bore 26. In FIG. 7, the butt-end 42A, due to the construction of a rod handle 44, extends into the central bore 26 a distance placing the butt-end 42A at about mid-length of the second bore section 31. In FIG. 8, the butt-end 43B, due to the construction of a rod handle 46, extends into the central bore 26 a distance located just above the restriction 32. The bore section 34 also results in a reduction of the wall thickness of the material as at 47 to enhance the ability of the bulbous section 12 to flex relative to the cylindrical section 11 as depicted in broken lines in FIGS. 7 and 8.

Some of the advantages of the overall construction of the cushion are to facilitate comfortable placement of the cylindrical section 11 into the armpit region of the fisherman's body to free up both hands of the fisherman to enable the replacement of a fishing lure or the like. In addition, and if the fisherman is seated, the cylindrical section 11 can be comfortably placed between the thighs while the fisherman sits on the bulbous section 12. The bore section 34 also enhances the compressibility of the bulbous section 12 to make sitting on it more comfortable.

If desired, and as shown at "A" and "B" in FIG. 3, the outer surface of the cylindrical section 11 and the bulbous section 12 of the cushion 10, except for the area inside the flutes 14 and 22 can be rendered unsmooth or roughened in a variety of ways. The unsmooth or roughened surface characteristic can be in the form of plural granule-like protuberances of uniform shape (as at "A") or of random shape (as at "B"). The unsmooth or roughened surface is provided for the purpose of enhancing the surface friction between the hands and/or clothing of the fishing person.

Although a particular preferred embodiment of the invention has been disclosed in detail for illustrative purposes, it will be recognized that variations or modifications of the disclosed apparatus lie within the scope of the present invention.

What is claimed is:

1. An elastic and portable slide on cushion for enveloping the butt-end of a fishing rod for interposition with the fisher-person's body to protect the body when fighting a fish, comprising:

an elongate unitary cushion body having a cylindrical section at a first end and a bulbous section at a second end, the external diameter of said bulbous section being greater than the external diameter of said cylindrical section, said cushion body being made of an elastic material that has the property of generally retaining its shape during use;

a central bore in said cushion body and opening outwardly at least at said first end to accommodate the insertion of a butt-end of the fishing rod therein, said central bore having a first section tapering from a first diameter portion adjacent said first end to a second diameter portion located mid-length of said cushion body, said first diameter portion being larger than said second diameter portion, said first and second diameter portions being of equal or lesser diameter than the butt-end of the fishing rod passing into said cushion to removably retain the rod in said first and second diameter portions of said central bore, said central bore having a second section enlarging in diameter from said second diameter portion toward an end of said bulbous section remote from said first end of said cylindrical section to a larger third diameter portion that is coaxial with said first and second diameter portions, said second section having a further bore providing a passageway extending from said second section outwardly to a central location of said exterior surface at said end remote from said first end; and an exterior surface of said bulbous section having a plurality of separate flutes thereon for enhancing a frictional gripping of said bulbous section of said cushion body with the fisher-person's body, said plurality of separate flutes on said bulbous section extending between a first location at a junction between said bulbous section and said cylindrical section and a second location spaced radially outwardly from said longitudinally extending axis of symmetry at said end remote from said first end, at least one of said flutes transitioning onto an exterior surface of said cylindrical section and terminating adjacent said first end to enhance the frictional gripping of at least one hand of the fisher-person with said exterior surface of said cylindrical section.

2. The elastic and portable slide on cushion according to claim 1, wherein a central longitudinal axis of said cylindrical section coincides with a geometric center of said bulbous section.

3. The elastic and portable slide on cushion according to claim 1, wherein said second diameter portion is located within said bulbous section.

4. An elastic and portable slide on cushion for enveloping the butt-end of a fishing rod for interposition with the fisher-person's body to protect the body when fighting a fish, comprising:

an elongate unitary cushion body having a cylindrical section of a first diameter at a first end and a bulbous section of a second diameter at a second end, said second diameter of said bulbous section being greater than said first diameter of said cylindrical section, said cushion body being made of an elastic material that has the property of generally retaining its shape during use with an initial axial alignment of a longitudinal axis of said cylindrical section and a geometric center of said bulbous section;

a central bore in said cushion body and opening outwardly at least at said first end to accommodate the insertion of a butt-end of the fishing rod therein, an interior surface of said central bore having a first section tapering co-axially from a first diameter portion adjacent said first end to a second diameter portion located mid-length of said cushion body, said first diameter portion being larger than said second diameter portion, said central bore having a second section enlarging in diameter co-axially from said second diameter portion toward an end of said bulbous section remote from said first end of said cylindrical section to a third diameter portion that is coaxial with said first and second diameter portions, said third diameter portion being larger than said second diameter portion, said interior surface of said second diameter portion being a curved surface joining said first and second sections, and a further bore providing a passageway between said second section and a central location of said exterior surface at said end remote from said first end, and wherein said elastic material forming said second section is additionally configured to flex to cause said geometric center of said bulbous section out of alignment with said longitudinal axis of said cylindrical section while the butt end of the fishing rod is operatively received in said central bore.

5. The elastic and portable slide on cushion according to claim 4, wherein an exterior surface of said bulbous section has a plurality of separate flutes thereon for enhancing a frictional gripping of said bulbous section of said cushion body with the fisher-person's body, at least one of said flutes transitioning onto an exterior surface of said cylindrical section and terminating adjacent said first end to enhance the frictional gripping of at least one hand of the fisher-person with said exterior surface of said cylindrical section.

6. The elastic and portable slide on cushion according to claim 5, wherein said plurality of separate flutes on said bulbous section extend between a first location at a junction between said bulbous section and said cylindrical section and a second location spaced radially outwardly from said longitudinally extending axis of symmetry at said end remote from said first end.

7. The elastic and portable slide on cushion according to claim 4, wherein at least a portion of an exterior surface of said elastic material is unsmooth.

8. The elastic and portable slide on cushion according to claim 4, wherein said configuration of said second section is in the form of a reduction in a wall thickness of said bulbous section to enhance the ability of said bulbous section to flex relative to said cylindrical section.

9. The elastic and portable slide on cushion according to claim 4, wherein said second diameter portion is located within said bulbous section.

* * * * *